July 10, 1934.  A. L. MAIN  1,966,414
CLAMP NUT DEVICE
Filed Oct. 15, 1931  2 Sheets-Sheet 1
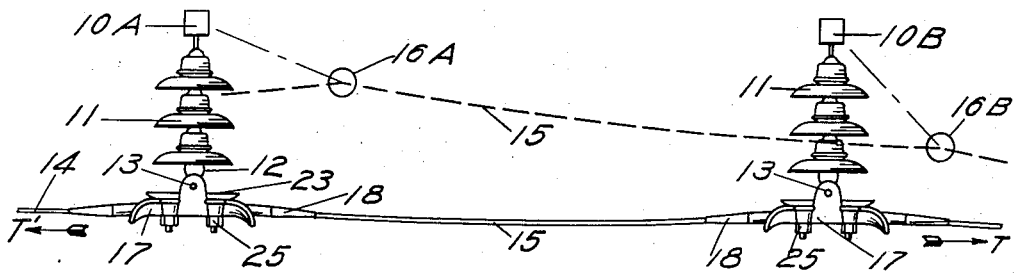
Fig. 1
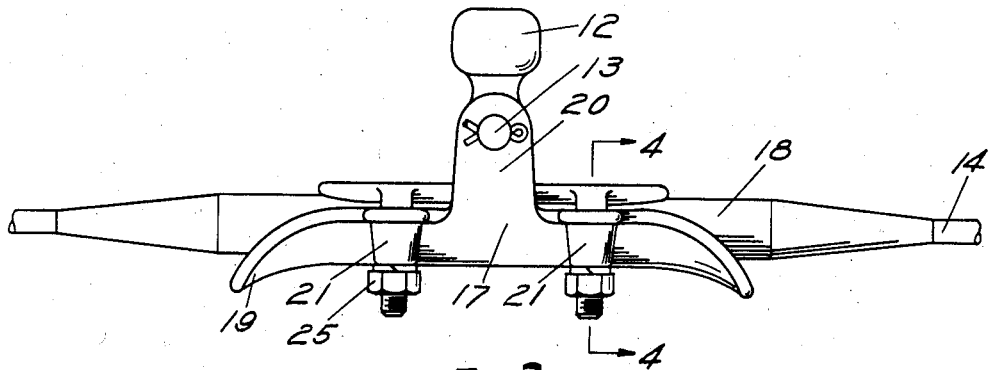
Fig. 2
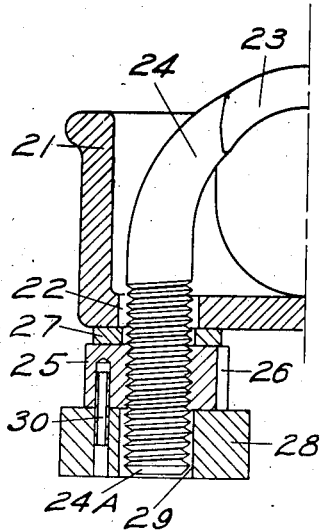
Fig. 4
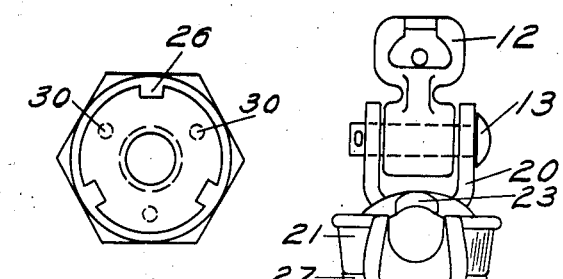
Fig. 6
Fig. 3
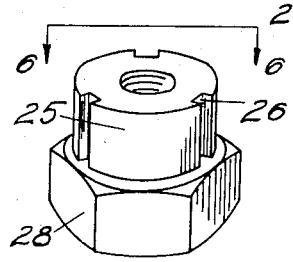
Fig. 5
AMOS L. MAIN
INVENTOR
BY Louis Illmer
ATTORNEY July 10, 1934.  A. L. MAIN  1,966,414
CLAMP NUT DEVICE
Filed Oct. 15, 1931  2 Sheets-Sheet 2

AMOS L. MAIN
INVENTOR
BY Louis Illmer
ATTORNEY

Patented July 10, 1934

1,966,414

UNITED STATES PATENT OFFICE 1,966,414

CLAMP NUT DEVICE

Amos L. Main, Cortland, N. Y., assignor to The Brewer-Titchener Corporation, Cortland, N. Y., a corporation of New York Application October 15, 1931, Serial No. 569,054

13 Claims. (Cl. 248—31)

This invention relates to improvements in the art of clamps of the bolted two-part type and has to do with a regulatable slip device capable of applying and of holding a predetermined clamping pressure upon an interposed gripped member; under emergency conditions, this slip device insures the liberation of said member when subjected to an abnormal yank that falls beyond the holding power of a prescribed clamping pressure.

My appurtenances are more particularly applicable to cable clamps comprising a grooved body part and a cooperating retainer or keeper part, such as are commonly used to pivotally suspend by means of a series of insulator strings, a continuously tensioned electrical conductor as suspended between long-span transmission towers or supporting poles.

Each of my clamping bolts may be provided with a novel assembled sectional nut of which the intended function and more salient operative features will be made manifest by the following explanation:

The suspension clamps herein contemplated are preferably of the kind that in service, might be subjected to inordinate loading should a heavy continuous conductor become ruptured under extreme icing or the like contingencies. In such event, the respective severed ends of the tightly tensioned transmission cable, instantly start to separate; this in turn, permits the now divided series of suspension clamps to rapidly swing apart about their respective insulator supports and which movement eventually sets up a succession of heavy whips or cable impacts that are liable to bring about tower failure and a resulting line outrage.

During the initial interplay of these unstabilized forces, the respective clamps contiguous to the severed cable end, are first caused to pivotally swing outwardly and upwardly in an arcuate path about the insulator chain length until the clamp assumes a raised dwell position that falls into approximate alignment with the direction of cable pull in a virtually dead-ended fashion. Further longitudinal cable movement will now be abruptly halted and this causes a centrifugal cable surge or horizontal whip effect to be exerted upon each of said virtually dead-ended clamps.

Thereupon, the slackened cable spans respectively start to fall toward the earth and are allowed to accumulate drop momentum of considerable magnitude prior to reaching their bottom-most overtravel or transient sag positions. As a result, the supporting towers will now be subjected to an additional heavy vertical cable whip. By the use of my clamp appurtenances, I am enabled to materially safeguard the towers against the destructive effects imposed by either of the cited cable whips. In the design of present-day transmission lines of large power capacity, it is found expedient to resort to long-span massive cables and yet keep down the tower weight to a point that will reduce installation costs to a minimum. The assured slip value afforded by my clamp appurtenances allows of safely reducing the tower weight without undue hazard.

One object of my invention is to devise an improved suspension clamp of the character indicated, that will work with a slip value set to a predetermined limit so that the supporting tower installation may be adequately protected against upset and cross-arm failure. While clamps of the automatically releasing type have heretofore been applied to similar purposes, these suffer from an inherent defect in that the keeper pressure is relieved before the clamp reaches the above defined dwell position, and hence the effect of any cable breakage is unrestrictedly felt a long distance from either side of the ruptured cable span. The accompanying excessive cable slip through many of such prematurely opened clamps, usually, permits a series of high-tension cable spans to fall to the ground or upon other cross-circuits, with attendant danger to life and augmented cost in rehabilitating the line connections.

A clamp having a springlike retaining member interposed between its keeper and the gripped cable, generally behaves in a manner substantially similar to the releasing clamp type in that such an inherently low keeper grip readily allows a relatively long length of ruptured cable to slip therethrough. For present purposes, a relatively high, predetermined cable grip is not only accurately measured but kept commensurate with the anticipated cable whip requirements in the event of cable rupture; a series of clamps that are set up too loosely upon the gripped cable become incapable of effectively localizing such a fault and upholding successive spans within the herein contemplated narrow limits. On the other hand, a conventional clamp not equipt with my improved nut applying instrumentalities, is likely to grip a heavy duty cable so tightly as to endanger its supporting towers. A primary objective of the present invention is to overcome the cited clamp defects and thereby better safeguard a high tension line installation.

A further purpose is to make my cable grip independent of the clamp swing-out position and to maintain a properly regulated heavy keeper pressure during the entire period that the clamp may be subjected to maximum cable impact, to the end that the resulting cable drop may be confined solely to the ruptured cable span. This goal is herein attained by means of certain clamp nut refinements adapted to positively limit the torsional moment that can be exerted in screwing up my clamp bolts. This clamp appurtenance preferably comprises a pair of cooperating nut members provided with fragile interconnecting means and of which the severable key-like member or implement may be discarded after having applied to the retaining nut member, a definitely limited screw-up effort.

By enameling one or both of the separable parts of such sectional nuts in distinctive bright or otherwise contrasting colors, an inspector by the use of field glasses, is enabled to drive along a completed transmission line and readily check up the workmanship given to the respective clamp installations and establish whether all of the now superfluous key-nut or telltale members have actually been twisted off and thereby subjected their mates to a uniform turning moment in excess of the ultimate shear strength of my fragile nut interconnecting means.

The present invention further seeks to guard against loosening of clamp nuts under continued line vibration and otherwise to promote the safety of high-tension transmission lines by means of novel features of manipulation, all of which will hereinafter be more fully set forth. Reference is had to the accompanying two sheets of drawings which are illustrative of certain embodiments of my improved devices, and in which:

Fig. 1 schematically represents a transmission line installation including adjacent insulator strings, each equipt with my improved clamp and arranged to suspend a longitudinally tensioned conductor therebetween.

Fig. 2 shows an enlarged side elevational view of one such clamp as assembled with a keeper, and Fig. 3 is an end view thereof.

Fig. 4 depicts a fragmental transverse view of one style of my two-piece sectional nut as taken along the line 4—4 of Fig. 2 and showing a plurality of fragile interconnecting pins that are perimetrically kept spaced apart.

Fig. 5 is a perspective view of my nut assembly prior to being applied in place, while Fig. 6 shows one end view as seen from the line 6—6 of Fig. 5.

Figure 12:
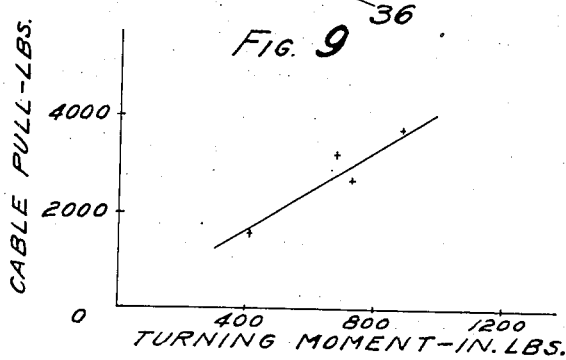

Fig. 12 graphically presents the results of certain slip tests made upon clamps as equipt with my improved devices.

Referring now to Fig. 1, this represents a series of tower cross-arms 10A, 10B etc., each adapted to pivotally support a chain of interlocking units such as 11 which may be built-up into a depending string of capped high-tension insulator discs in the conventional manner. The uppermost unit is shown as linked to its cross-arm while the lowermost unit is usually provided with an adapter 12 to which a cable clamp assembly may be pivotally connected by means of the fulcrum pin 13. Suspended between such clamps, is a continuous horizontal conductor 14 comprising an intermediate cable span 15 which is commonly strung under a relatively heavy initial line tension T and normally balanced by the counterpull T'. Should the cable suffer rupture at its T' region, this will allow the now unopposed tension T to bodily thrust or whip the span 15 together with its suspension clamps, into their respective cocked dwell positions designated as 16A and 16B, and thereupon bring about the successive cable impulses previously defined. It is preferred to mount my clamp keeper upon the suspended cable without the use of an intermediary leaf spring or other resilient devices in order to impose a relatively high frictional grip thereon whose slip value exceeds the major portion of the initial cable tension T.

Both the horizontal and the vertical cable whip reactions upon the supporting tower, may be closely held within prescribed bounds by the improved style of clamp disclosed in Figs. 2 and 3. This may comprise a cross-sectionally trough shaped body member 17 that is upturned to freely receive the conductor cable 14 and which, in the case of stranded aluminum cables, is preferably equipt with reenforcing armor rods 18. The trough ends are shown provided with depending lips 19 that flare outwardly away from the conductor axis so as to prevent kinking the cable or armor rods when the clamp becomes cocked in dwell position. The grooved cable seat is longitudinally given a smooth convex contour while the transverse groove width is kept considerably larger than the overall cable diameter to prevent excessive binding therebetween. The clamp body may be carried by apertured supporting straps 20 which are kept spaced apart to pivotally receive the adapter link therebetween, as shown. Attached exteriorly to the respective side walls of the body groove and spaced lengthwise therealong, are pairs of body bosses 21, each provided with a bolt receiving hole 22 disposed transversely of the groove axis.

The conductor retaining member herein disclosed, is of the one-piece type and as such, may comprise a keeper bar 23 having pairs of downturned extensions or bolt shanks such as 24, of which the respective ends are threaded at 24A to receive my sectional clamping nut. Said depending shanks are suitably spaced to register with the lateral spread given to the boss holes and allow of applying my nuts thereto from below. It may here be pointed out that the same results are to be had when a bossed keeper is clamped to its body by means of separate threaded fastening bolts of the conventional type.

As exemplified in Figs. 4 to 6, my improved sectional shear-nut consists of an internally threaded primary or retaining member 25 which is preferably made up from cylindrical stock having a plurality of spanner wrench slots 26 cut in the perimetric surface thereof. A lock washer 27 of the spring type is usually interposed between the retaining nut 25 and its cooperating body boss 21 as shown. The tubular setting-up implement or key-nut member 28 of my clamp device is preferably formed up separately and provided with an unthreaded aperture 29 that is axially disposed in alignment with the thread of said retaining nut to freely slip over the shank thread 24A without thread engagement. The perimetric surface of said key-nut or implement is preferably made radially irregular or polygonal in shape and the flats given a size somewhat larger than the diameter of the retaining nut 25, so that an ordinary wrench when applied to the key-nut surface, will not carry along the threaded nut section except through my severable interconnecting means.

Said complementary nut sections are preferably of the two-piece type, respectively provided with a plurality of relatively small registering pin-receiving holes which may be arranged parallel to and radially offset about the common nut axis in the symmetrical fashion indicated in Fig. 6. Into each pair of these aligned holes, there is tightly fitted a shear-pin 30 of fragile material such as soft brass or the like, which as shown in Fig. 4, is preferably given a tubular formation. Said severable interconnecting means holds the sectional nut as a unit and in production; all such aligning nut holes may be drilled to a given size and by the use of a suitable inner tube size, the shearable pin area may be selectively changed to suit any desired specifications. Fig. 5 makes evident the unitary character of my two-piece nut device, it being the intent to factory assemble the described separate pieces so that when sold, such sectional nuts are ready to be applied. The several mechanical interconnections between said mated sectional nuts are preferably kept spaced apart around the nut axis in symmetrical relationship to adequately withstand the anticipated lateral wrench pull required to shear off the fragile pins. Such inserted severable pins can readily be purchased to exact diametral size and thereby hold the desired shear area to a correspondingly close predetermined value which inherent accuracy and ability to consistently reproduce the same, is a matter of paramount importance as applied to present purposes. It is further emphasized that the provision of an irregular wrench engaging surface on part of the retaining nut 25, permits of conveniently dismantling the installed keeper 23 for clamp repair and cable removal purposes, subsequent to shearing off the severable pins 30.

Figure 7:
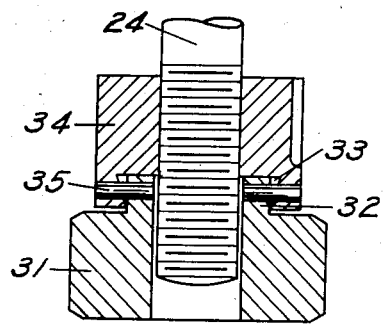
Fig. 7 represents a modified type of my nut device and the relationship of its component parts prior to being sheared apart and Fig. 8 shows this retaining nut part after being drawn into place and secured with a lock washer of the expansible type indicated by Fig. 9.
Figure 8:
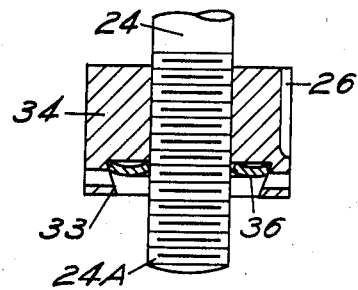
Figure 11:
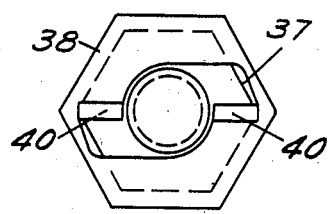
Figure 9:

Figs. 7 and 8 represent a modified type of nut which is similar in principle except that the shear pins are now inserted crosswise of the common nut axis. The abutting nut faces are here given a male and female formation, the implement 31 being provided with a centering projection 32 which is received within an undercut recess 33 carried by the retaining nut 34, one or more shear pins 35 being interlockingly entered through both of these telescoped elements, as shown. After applying a twisting moment upon the key-nut or implement sufficient to simultaneously shear off all of said pins, this discarded nut section will leave said recess exposed to view. By now inserting the expansible crimped ring 36 (see Fig. 9), this may be flattened into said recess and thus firmly secure the nut 34 upon its keeper shank under adverse conditions of conductor vibration. Said ring may be made from pliable metal and given a cross-sectionally dished or V shape having an initial overall diameter somewhat smaller than the recess mouth but which ring when flattened, is spread outwardly against the undercut recess and jammed inwardly between the shank threads.

Figure 10:
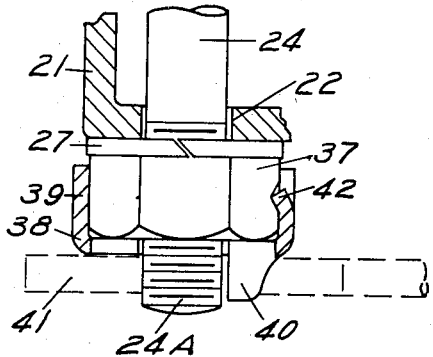
Fig. 10 illustrates still another modification of my sectional clamp nut and Fig. 11 is a top view thereof.

Fig. 10 shows another alternative structure intended to accomplish the same general purposes. Here the threaded retainer nut 37 is of the regular hexagonal type and a stamped socketed cap 38 having a skirt portion 39, is slipped over and made to snugly embrace the perimeter of the hex nut. The crown plate of this cap is shown centrally perforated to clear the threaded shank therethrough and is further provided with a pair of struck-up ear-lugs such as 40. By applying a suitable wrench 41 thereto of the kind indicated in dotted outline, said hex nut may be screwed up to a degree where the oppositely disposed ears are sheared off or become definitely distorted so as to free the wrench grip and thereupon likewise leave the retaining nut properly drawn up on its threaded bolt shank. Said nut may be held within the cap as a unitary assembly, by the use of crimping prongs 42 or the like.

The Fig. 12 graph shows the results of certain laboratory tests made upon suspension clamps using the Fig. 4 style of shear-nuts. The ordinates of this plot represent the force required to bring about initial cable slip while the abscissae measures the predetermined turning moment applied to each of my shear-nuts of about 5/8" U. S. standard size. It will be observed that the given clamp slip values vary in a substantially fixed, straight-line relationship with the increased turning moment required to sever the shear pins. Except for the use of such intermediary scale means that positively limits and equalizes the nut pull-up coming upon each of the keeper bolts, the resulting relatively heavy clamp pressure would become erratic and uncertain, it being found that even a qualified workman when guided by judgment alone, is unlikely to obtain the uniformly consistent slip-test results that are afforded by my simple control devices.

Regarding the mode of installation and method steps required in applying my shear bolts, these are as follows: Having mounted the cable into the upturned mouth of the suspended body clamp, the keeper is superimposed thereon and its depending shanks entered into the respective boss holes, whereupon a sectional nut is applied to each of the threaded shank ends. These nuts are preferably drawn up evenly in step-wise fashion until the prescribed turning moment is approached, when by a final effort, the respective key-nuts or implements are successively sheared off, which leaves the several retaining nuts operatively installed on the transmission cable.

The predetermined slip value of the clamp may be varied to suit circumstances. It is preferred to give the nuts a definite setting, this being such that none but the broken or possibly an immediately adjacent cable span will be allowed to reach the ground and will at the same time provide for a sufficient clamp slip that will still relieve all lighter towers against any abnormal cable whip effects. This objective usually requires the use of relatively heavy clamping pressures to prevent the gripped armor rod from being wholly withdrawn from its clamp even under line rupture conditions. One essential difference in the characteristic behavior of my clamp nuts over those commonly applied in the case of the conventional non-releasing clamp, lies in assurance that my improved clamp nuts cannot be drawn up to a point likely to endanger any relatively light supporting tower structure when this has been designed to withstand a moderate and definite whip loading. As a result, I am enabled to provide for a clamp that will properly confine the cable drop to one or two spans and hold the resulting impact within predicable limits.

In further explanation, it may be pointed out that each series of lighter transmission towers as equipt with my nut devices, may in practice be reenforced by an interposed extra-heavy tower to which the adjacent cable ends are each dead-ended in order to forestall a possible collapse of the transmission system as a whole under extraordinarily adverse weather conditions.

It will be obvious that any suitable conductor clamp may be equipt with my improved nuts, likewise the use of complementary side straps is not a necessary requirement for supporting the aforesaid trough-shaped body since my nut devices are also applicable to side opening clamps where but a single strap is needed. It is further to be understood that various other changes in the structural details or mode of manipulation may be resorted to in carrying out the same principles underlying my keeper fastening; and that while it is generally preferred to adhere to the cited structural disclosures, the same results might also be obtained by reversed or otherwise modified means, all without departing from the spirit and scope of my invention, heretofore described and more particularly pointed out in the appended claims.

I claim:

1. A clamp comprising a body part and a part complementary thereto, a gripped member slidably interposed between said parts, a plurality of threaded bolts serving to adjustably draw said parts toward the interposed member, separate retaining nuts respectively engaging each of the bolt threads, and separate cooperating implement means for each of said nuts and respectively serving to positively screw up all of said retaining nuts to a substantially equalized degree, each of said implements being coupled to their respective nuts by a plurality of severable interconnections.

2. A clamp comprising a body part and a part complementary thereto, a gripped member slidably interposed between said parts, threaded bolt means serving to clamp said parts about said member, a threaded retaining nut for the bolt, a separate moment applying implement having a bore therethrough that is larger than the diametral size of said bolt, and a plurality of severable interconnecting means cooperatively assembling said nut with the implement and serving to initially maintain the nut thread and implement bore in substantial axial alignment, the respective severable interconnecting means being disposed in a spaced apart relation around said aligned axis.

3. Clamp means comprising complementary parts, threaded bolt means serving to clamp said parts together, and a two-piece sectional nut including a retaining piece provided with a wrench engaging surface and that is internally threaded for cooperation with the bolt threads and further including a supplementary piece having a relatively fragile, severable interconnection with said retaining member assembled to constitute a unitary nut structure prior to severing its component pieces and which structure subsequent to severing said components, leaves the retaining piece operatively and removably screwed up upon a bolt thread.

4. Clamp means comprising complementary parts, threaded bolt means serving to clamp said parts together, a retaining nut having an irregular wrench surface and that is internally threaded to cooperate with the bolt threads, an apertured moment applying implement having a similar wrench surface placed in axial alignment with the retaining nut surface, the diametral wrench surface size of the implement being different from that given to said nut, and a plurality of shear-pins interconnecting the nut with said implement.

5. Clamp means comprising complementary parts, clamping nut and bolt means of the threaded type fastening said parts together, and a socketed cap telescopically embracing the bolt nut, said cap being provided with a fragile wrench lug means serving as a severable medium through which to apply a measured turning moment to the bolt nut.

6. Clamp means comprising complementary parts, threaded nut and bolt means for clamping together said parts, a socketed cap having a crown plate provided with severable lug means and further provided with a skirt shaped to operatively embrace the wrench surface of the bolt nut, and means for removably retaining the nut within the cap.

7. Clamp means comprising complementary parts, threaded bolt means for clamping said parts together, retaining nut means cooperating with the bolt threads, and intermediary nut means for applying and transferring a turning moment to said retaining nut through a plurality of shearable interconnecting means of the tubular type.

8. A cable clamp comprising a grooved body part, a complementary keeper part and an initially tensioned cable gripped to slip between said parts, a plurality of stretchable clamping screw members cooperatively disposed between said keeper and the clamp body, and demountable nut means separately engaging each screw member, each such nut including a shearable fragile element whose cross-sectional area is definitely sized and which by the shearing thereof transmits an accurately measured nut applying moment beyond which the respective screws cannot be subjected, the corresponding slip value of the clamped cable being dependent upon the aggregate stretch imparted to the several screw members subsequent to the shearing of their respective nut elements and which slip value exceeds the major portion of the initial cable tension.

9. A cable clamp comprising a grooved body part, a complementary keeper part and a gripped cable withdrawably interposed to slip between said parts, a pair of stretchable clamping screws extending between said keeper and the clamp body to impose a clamping pressure upon the gripped cable, and demountable nut means separately engaging each clamping screw, each such nut including a pin receiving hole having a shearable pin inserted therein and which pin by the transverse shearing thereof transmits a definitely measured nut applying moment beyond which the respective screws cannot be subjected, the corresponding slip value on part of the gripped cable being proportionate to the combined clamping pressure exerted by the several screws subsequent to the shearing of their respective nut pins.

10. A clamp comprising a body member, a complementary retaining member and a gripped member withdrawably interposed to slip between the first named members, a plurality of stretchable clamping screws cooperating with the retainer and the clamp body to impose a clamping pressure upon said gripped member, and separate demountable two-part nut means for each clamping screw, the respective parts of each such nut being equipt with an intermediary fragile element which by the severing thereof, transmits a definitely measured nut applying moment beyond which the several screws cannot be subjected, said body and keeper members thereby imparting to the gripped member a corresponding maintained slip value substantially proportionate to the aggregate stretch given to the several clamping screws subsequent to the severing of their respective fragile elements.

11. A cable clamp comprising a grooved body part, a complementary keeper part and a gripped cable withdrawably interposed to slip between said parts, a plurality of threaded clamping shanks extending between said keeper and the clamp body to impose a clamping pressure upon the gripped cable, and separate demountable nut means engaging each shank thread, the respective nuts each including a shearable fragile element of the same cross-sectional size which by the shearing thereof transmits a definitely limited and substantially equal nut applying moment to their respective shanks and thereby imposes a combined clamping pressure of predetermined slip value upon the gripped cable subsequent to the shearing of the respective fragile elements.

12. A clamp comprising a pair of separable parts, a gripped member withdrawably interposed to slip between said parts, a plurality of threaded bolt shanks extending between said parts to impose a clamping pressure upon the gripped member, and separate threaded nut means cooperatively engaging each such shank thread, the respective nuts each including a severable fragile element that is wholly offset radially outward beyond the nut thread confines and which by the severing thereof, transmits a definitely measured nut applying moment to their respective shanks and thereby imposes a corresponding combined clamping pressure upon interposed gripped member.

13. A clamp comprising complementary parts, gripped member withdrawably interposed to slip between said parts, a pair of threaded bolt shanks cooperating with said parts to impose a clamping pressure upon the gripped member, a separate threaded nut engaging each such shank thread, the respective nuts each including a plurality of severable fragile elements that are perimetrically spaced apart and bodily offset radially outward beyond the nut thread confines, means for simultaneously severing the plural elements of each such nut and which elements subsequent to being severed, respectively transmit a definitely limited turning moment to the nuts thereof and thereby impose a combined clamping pressure upon the interposed gripped member having a corresponding measured slip value.

AMOS L. MAIN.